United States Patent
McCook et al.

(10) Patent No.: US 6,744,613 B2
(45) Date of Patent: Jun. 1, 2004

(54) SYSTEM AND METHOD FOR FILTERING MULTIPLE ADVERSE CHARACTERISTICS FROM A POWER SUPPLY SOURCE

(76) Inventors: Michael McCook, 2744 N. Sugan Rd., New Hope, PA (US) 18938; Andrew Benton, 124 Thatchers Hill Rd., Flemington, NJ (US) 08822

( * ) Notice: Subject to any disclaimer, the term of this patent is extended or adjusted under 35 U.S.C. 154(b) by 103 days.

(21) Appl. No.: 10/086,251

(22) Filed: Mar. 1, 2002

(65) Prior Publication Data

US 2003/0165035 A1 Sep. 4, 2003

(51) Int. Cl.$^7$ ................................................ H02H 3/22
(52) U.S. Cl. ...................................... 361/111; 361/118
(58) Field of Search ......................... 361/57, 111, 118

(56) References Cited

U.S. PATENT DOCUMENTS

| | | | | |
|---|---|---|---|---|
| 4,573,113 A | * | 2/1986 | Bauman | ........................ 363/48 |
| 4,870,528 A | * | 9/1989 | Harford | ........................ 361/56 |
| 5,530,396 A | * | 6/1996 | Vlatkovic et al. | ........... 327/552 |
| 5,930,130 A | * | 7/1999 | Katyl et al. | .................... 363/53 |
| 6,400,539 B1 | * | 6/2002 | Sekiguchi et al. | ............. 361/31 |

* cited by examiner

Primary Examiner—Hung V. Ngo
(74) Attorney, Agent, or Firm—LaMorte & Associates

(57) ABSTRACT

A system and method for conditioning a power transmission, thereby eliminating adverse characteristics from the power transmission. The system selectively includes a voltage surge protector, an EMI/RFI filter and at least one inrush current suppressor integrally formed into a single system. To condition an incoming power transmission, the power transmission is passed through the voltage surge protector to eliminate any abnormal voltage spikes. The power transmission is then passed through an improved EMI/RFI filter having a dual output. The outputs of the EMI/RFI filter lead into a first inrush current suppressor. The inrush current suppressor limits the amperage of the power transmission for a predetermined period of time and then permits unrestricted current flow.

15 Claims, 3 Drawing Sheets

SYSTEM AND METHOD FOR FILTERING MULTIPLE ADVERSE CHARACTERISTICS FROM A POWER SUPPLY SOURCE

BACKGROUND OF THE INVENTION

1. Field of the Invention

In general, the present invention relates to systems that filter out adverse characteristics that may be present in a power transmission from a power supply. More particularly, the present invention relates to the systems that provide voltage surge protection, EMI/RFI protection and/or in-rush current suppression to a power transmission.

2. Prior Art Statement

The prior art is replete with different types of devices and circuits that filter out undesired electrical characteristics from an incoming source of electricity. In the United States of America, most every home and business is supplied with power from a utility company. Typically, the power supplied from the utility company passes through a transformer and is supplied to a building with an alternation current of 120 volts and a nominal frequency of 60 Hz. Although the power at the utility company is generated at these voltages and frequency values, the actual power received at a particular home or business can vary widely depending upon both how the power is transmitted and how the power is used.

Power transmission lines emanating from utility companies are commonly exposed to the elements as they travel from the utility company to a home or business. As such, the power transmission lines are subject to lightning strikes, interference from sun flares, storm damage and the like. All of these occurrences can create abnormalities in the characteristics of the power being transmitted in the transmission line. For example, a lightning strike in a power transmission line can create a large voltage spike in the power being transmitted. If this voltage spike is received by a home or business, the voltage spike can cause damage to many electronic items that experience the voltage spike. Alternatively, power can be disrupted if the spike causes a circuit breaker to trip.

Similarly, power transmission lines can receive electromagnetic interference (EMI) and/or radio frequency interference (RFI) from natural and manmade sources. The resulting EMI/RFI signals cause noise in the characteristics of the power transmission that can disrupt sensitive electronic circuits that receive such power transmissions.

Power transmissions with undesirable characteristics can also be created by the way power is used in a home or business. Many electronic devices draw a higher current when they are first turned on. This is because the circuits in the electronic device are cold and the capacitors in the circuits are not charged. However, soon after the circuit is powered, the current drawn by that circuit can decrease dramatically. As a result, when an electronic device is first turned on, there is an inrush of current, thereby causing a current spike. If multiple electrical devices are all turned on at once, the inrush current spike can be quite large and either cause a circuit breaker to trip or cause damage to the electronic components of those devices that experience the current spike.

In the prior art, there are many different filtering devices that are used to eliminate adverse characteristics from a power supply. However, many of these filters are designed to filter out only one type of adverse characteristic. For example, there are many types of commercially available surge protector items that can eliminate voltage spikes caused by lightning. Such prior art surge protectors are exemplified U.S. Pat. No. 4,870,534 to Harford, entitled Power Line Surge Protector. However, such prior art surge protection devices do not protect from EMI/RFI signal interference or incidents of inrush current.

Similarly, devices exist in the prior art record that are designed to filter EMI/RFI signal interference from power supplies. Such prior art filters are exemplified by U.S. Pat. No. 5,530,396 to Vlatkovic, entitled EMI Input Filter Power Factor Correction Circuits. However, such prior art devices do not filter out voltage surges or inrush current surges.

Lastly, devices exist in the prior art that are designed to eliminate inrush current surges. Such prior art devices are exemplified by U.S. Pat. No. 4,573,113 to Bauman, entitled Surge Protection System For A D-C Power Supply During Power-up, and U.S. Pat. No. 5,930,130 to Katyl, entitled Inrush Protection Circuit. However, such prior art devices do not filter out EMI/RFI signal interference or voltage surges.

A need therefore exists for an improved filtering system that is capable of eliminating voltage surges, EMI/RFI signal interference and inrush current spikes from a power source. This need is met by the present invention as described and claimed below.

SUMMARY OF THE INVENTION

The present invention is a system and method for conditioning a power transmission, thereby eliminating adverse characteristics from the power transmission. The system includes a voltage surge protector, an EMI/RFI filter and at least one inrush current suppressor integrally formed into a single system. To condition an incoming power transmission, the power transmission is first passed through the voltage surge protector to eliminate any abnormal voltage spikes. The power transmission is then passed through an improved EMI/RFI filter having a dual output. The outputs of the EMI/RFI filter lead into a first inrush current suppressor. The inrush current suppressor limits the amperage of the power transmission for a predetermined period of time and then permits unrestricted current flow. The inrush current suppressor also can be used as an on/off switch to stop the power transmission. The on/off state of the inrush current suppressor is dependent upon the receipt of an external control signal by the inrush current suppressor.

Electronic equipment receives the power transmission through the circuitry of the inrush current suppressor. Multiple inrush current suppressors can be arranged in a cascading system to power many different collections of electronic equipment. As one inrush current suppressor is activated, it generates a time delayed control signal that can be used to activate a subsequent inrush current suppressor. In this manner, different collections of equipment can be turned on in a controlled sequence that does not surpass the amperage rating of the circuit breaker through which the power transmission is passed.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Although the present invention power conditioning system can be created as internal circuitry within many different types of electronic equipment, the present invention power conditioning system is particularly well suited for use as a self-contained unit. In this manner, the present invention power conditioning system can be used to condition incoming electrical power and any separate electronic device can then be connected to the power conditioning system to receive the conditioned power. Accordingly, in the exemplary embodiment of the invention that is shown, the present invention power conditioning system is shown as a self-contained unit that is separate from the electronic equipment that receives electrical power through the power conditioning system.

Figure 1:
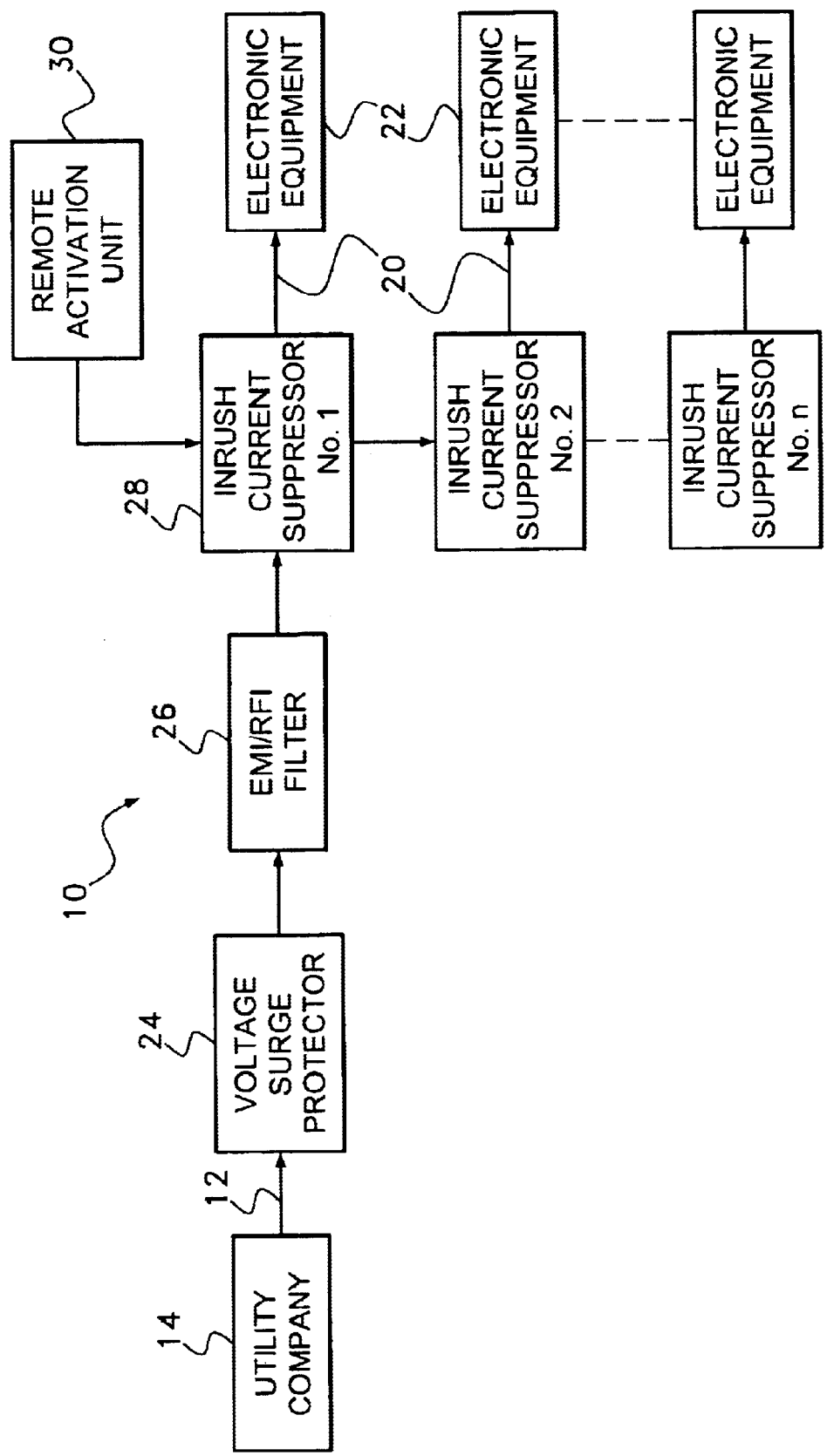
FIG. 1 is schematic of an exemplary embodiment of a power conditioning system in accordance with the present invention.

Referring to FIG. 1, a schematic of the present invention power conditioning system 10 is shown. In the embodiment, the power conditioning system 10 is connected to utility power lines 12 and receives power from the local utility company 14. The power conditioning system 10 removes adverse characteristics that may be present in the incoming electrical power transmission and presents the conditioned power to at least one output port 20. The output port 20 can be the circuit breaker box of a building, thereby providing filtered power to every receptacle in the building. Alternatively, the output port 20 can be a single receptacle that supplies filtered power to a single piece of electrical equipment 22 that is plugged into the power conditioning system 10.

In the power conditioning system 10 there are three types of circuits that are used to condition the power transmission received from the utility company 14. Each type of circuit filters a particular adverse electrical characteristic from the received power. The first of the circuits, is a voltage surge protector 24. The voltage surge protector circuit 24 eliminates voltage spikes in the received power transmission that may be caused by lightning strikes, shorted transformers or the like. In the prior art, there exist many different types of voltage surge protector circuits that can eliminate voltage spikes. Many of these prior art circuits can be adapted for use in the present invention filtering system. However, the surge protector circuitry found in U.S. Pat. No. 4,870,528 to Harford, entitled Power Line Surge Protector is particularly advantageous and is preferred in the exemplary embodiment of the invention. Accordingly, the disclosure of U.S. Pat. No. 4,870,528 to Harford is therefore incorporated into this specification by reference.

The second type of power condition circuit, embodied by the present invention system, includes an EMI/RFI filter 26. The output of the voltage surge protector 24 is received by an EMI/RFI filter 26. Due to the presence of the voltage surge protector 24, any voltage spikes in the received power signal have been removed. However, EMI and/or RFI signal noise can still be present in the power signal. The EMI/RFI filter 26 reduces noise present in the power signal transmission that can be categorized as either electromagnetic interference or radio frequency interference. In the prior art, there exist many types of EMI/RFI filters. Many of these prior art filters can be adapted for use as part of the present invention power condition system 10. However, a specific EMI/RFI filter 26 is preferred in the exemplary embodiment. This circuit will later be described with reference to FIG. 2.

The output of the EMI/RFI filter 26 is then received by at least one inrush current suppressor 28. It is the inrush current suppressor 28 that is the third power conditioning circuit of the present invention system 10. As such, by the time the power transmission is received by the inrush current suppressor 28, the power transmission has already been filtered of voltage spikes and EMI/RFI noise. At least one inrush current suppressor is present in the power conditioning system 10. However, as is shown in FIG. 1, any plurality of separate inrush current suppressors 28 can be used. As will later be explained, the various inrush current suppressors 28 can be arranged in a cascading array. As such, each of inrush current suppressors 28 is activated after the previous inrush current suppressor 28 has finished powering up. In this manner, separated groupings of electronic equipment 22 can be kept on the same circuit without surpassing the amperage rating for that circuit when the various groupings of equipment are first turned on.

As is shown in FIG. 1, each inrush current suppressor 28 supplies power to a separate grouping of electronic equipment 22. The first of the inrush current suppressors 28 may also be optionally coupled to a remote activation unit 30. As will later be explained, the remote activation unit 30 enables the first of the inrush current suppressors 28 to be selectively activated when needed and/or desired.

Accordingly, the present invention power conditioning system 10 takes the power transmission from the utility company, removes voltage spikes, EMI/RFI noise and inrush current spikes prior to that power being presented to an electronic device 22.

Figure 2:
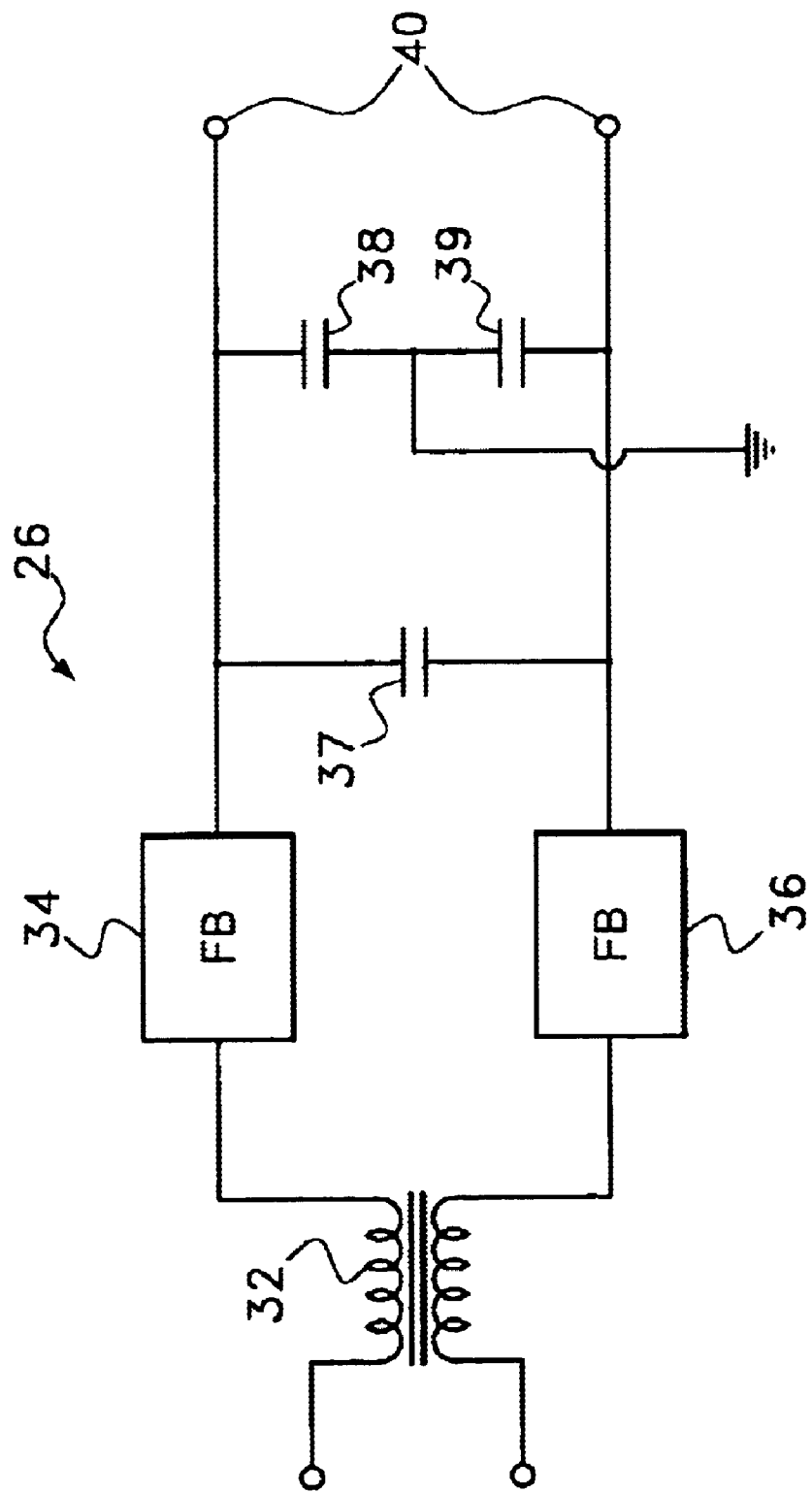
FIG. 2 is a schematic of an exemplary embodiment of an EMI/RFI filtering circuit for use in the present invention power conditioning system.

Referring now to FIG. 2, an exemplary embodiment of an EMI/RFI filter 26 is shown that can be used in the present invention power conditioning system 10. The EMI/RFI filter 26 receives a power transmission from the voltage surge suppressor 24 (FIG. 1). The EMI/RFI filter 26 contains a mutual inductor 32, sometimes referred to as a common-mode choke. The mutual inductor 32 provides mode attenuation to EMI noise and RFI noise. Two ferrite beads 34, 36 are used on the leads that leave the mutual inductor 32. The presence of the ferrite beads 34, 36 provides series impedance to the power signal, thereby attenuating EMI noise and RFI noise. The presence of the ferrite beads 34 also prevents the EMI/RFI filter 26 from ringing and helps control filter characteristics. The EMI/RFI filter 26 also contains three capacitors. The first capacitor 37 is for when the filter is operating in normal mode, wherein the capacitor 37 provides low impedance to EMI noise and RFI noise. The second and third capacitors 38, 39 are arranged across the outputs of the filter 26 and provide low impedance to EMI noise and RFI noise when the filter operates in a common mode.

Figure 3:
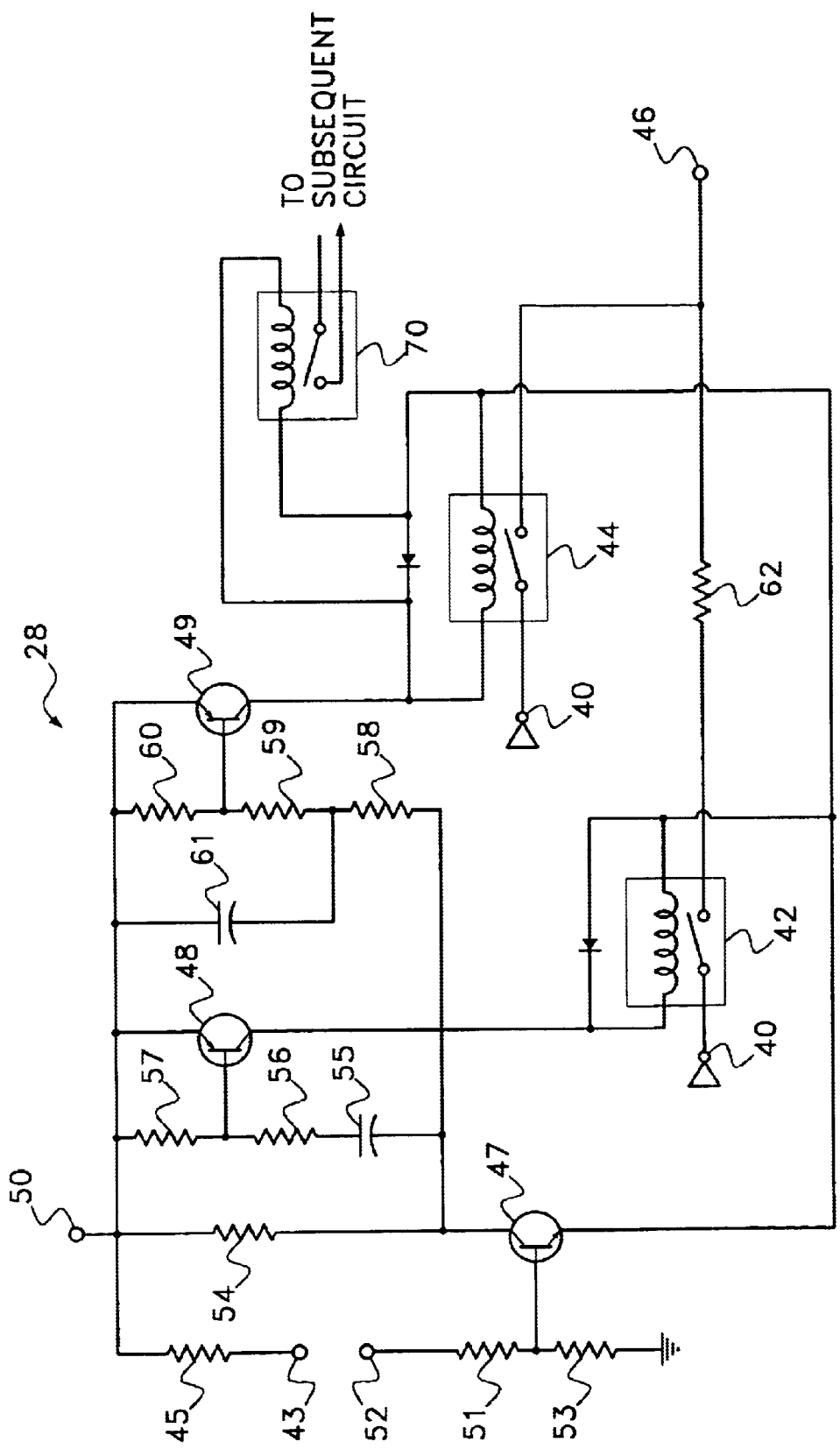
FIG. 3 is a schematic of an exemplary embodiment of an inrush current suppressor circuit containing control circuitry for use in producing an automatically cascading system.

The EMI/RFI filter 26 shown in FIG. 2 has two outputs 40. These outputs 40 are received by the inrush current suppressor 28, which is shown in FIG. 3. Referring to FIG. 3, it will be understood that the output of the EMI/RFI filter 26 is 120 volts AC. However, EMI/RFI noise has been removed and voltage spikes have been eliminated. The outputs 40 of the EMI/RFI filter 26 are supplied to the inrush current suppressor at two points. At the first point, the incoming power passes into a first relay 42. At the second point, the incoming power passes into a second relay 44. If either the first or second relay 42, 44 is closed, the power passes through to an output port 46. It is this output port 46 that is coupled to external electronic equipment 22 (FIG. 1).

The operation of the first and second relays 42, 44 is dependent upon an integrated control circuit containing three transistors 47, 48, 49. The integrated control circuit has two control signal input ports 43, 52 that are used to trigger the operation of the circuit. The first control signal input port 43 is coupled directly to the common DC voltage 50. A first resistor 45 is disposed within the connection pathway. The second control signal input port 52 is coupled to the base of the first transistor 47. A second resistor 51 is disposed in this pathway.

The collector of the first transistor 47 and the emitters of the second and third transistors 48, 49 are connected to a common DC voltage 50. A third resistor 53 is present between the base of the first transistor 47 and ground. A fourth resistor 54 is present between the collector of the first transistor 47 and the common DC voltage 50.

The base of the second transistor 48 is coupled to the collector of the first transistor 47. However, a first capacitor 55 and a fifth resistor 56 are positioned in series between these two points. A sixth resistor 57 is positioned between the base of the second transistor 48 and the DC voltage source 50, wherein the sixth resistor 57 is in series with both the fifth resistor 56 and the first capacitor 55.

The base of the third transistor 49 is coupled to the collector of the first transistor 47. However, a seventh resistor 58 and an eighth resistor 59 are positioned in series between these two points. A ninth resistor 60 is positioned between the base of the third transistor 49 and the common DC voltage 50, wherein the ninth resistor 60 is in series with both the seventh resistor 58 and the eighth resistor 59. A second capacitor 61 is placed in parallel with the eighth and ninth resistors 59, 60, respectively.

The operation of the various transistors 47, 48, 49 and thus the first and second relays 42, 44 are controlled by the selective application of a control input voltage. The control input voltage is received at the control signal input port 52 and can be between 5 volts and 30 volts DC. Alternatively, the circuit can be controlled by a contact closure between the first control signal input port 43 and the second control signal input port 52, wherein the second control signal input port is directly coupled to the common DC voltage 50.

When a control input voltage is received that is over 5 volts DC, the first relay 42 is energized and the power supply signal is transmitted directly from the input ports 40 to the output port 46 through a high energy surge resistor 62.

When an appropriate voltage is applied to the control signal input port 52, the voltage is immediately experienced by the second resistor 51 and the first transistor 47 is switched on. Once the first transistor 47 is switched on, the voltage at the fourth resistor 54 and seventh resistor 58 are pulled low. The first capacitor 55 is initially uncharged. Accordingly, when the first transistor 47 is turned on, the voltage across the fifth resistor 56 is pulled down. This turns on the second transistor 48. The activation of the second transistor 48 enables the first rely 42 to be energized, thereby enabling electricity to flow from the first of the input ports 40 to the output port 46. However, the AC current flowing through the first relay 42 passes through the high energy surge resistor 62 that limits the inrush current to a maximum of 25 amps.

Simultaneously, as the first transistor 47 turns on and the seventh resistor 58 is pulled low, the second capacitor 61 charges. The second capacitor 61 is initially uncharged and therefore prevents the voltage on the eighth resistor 59 from being pulled low. As the voltage on the eighth resistor 59 rises, the third transistor 49 turns on. However, this takes about one half of a second to occur. This period of time can be selectively adjusted between 0.1 seconds and 1.0 second by varying the values associated with the eighth resistor 59 and second capacitor 61. Once the third transistor 49 is turned on, the second relay 44 is energized. When the second relay 44 is energized, the high energy surge resistor 62 is bypassed and current flows directly to the output port 46 unrestricted.

As the first capacitor 55 continues to charge, the voltage on the fifth resistor 56 rises. After between a one second and a five second delay, the second transistor 48 turns off. This de-energizes the first relay 42, thereby disconnecting the high energy surge resistor 62 from the load. This protects the high energy surge resistor 62 from overheating or burning out should the second relay 44 fail to energize.

An optional third relay 70 can also be used within the circuitry of the power conditioning system 10. The third relay 70 has a coil that is wired in parallel to the coil of the second relay 44. Accordingly, when the third transistor 49 is activated, both the second relay 44 and the third relay 70 are energized. When the third relay 70 is energized, at least one new circuit is closed. A control voltage can be sent through the circuit that is closed by the third relay 70. This circuit can be interconnected to the control signal input ports of a second inrush current suppressor circuit that is identical to the one shown in FIG. 3. As has been previously described, the third transistor 49 does not activate until approximately one half second after the activation of the first transistor 47. Accordingly, since the third relay 70 is controlled by the third transistor 49, the third relay 70 does not energize until approximately a one half second delay has occurred.

By interconnecting the contacts of the third relay 70 of one inrush current suppressor 28 to the control signal input ports of a subsequent inrush current suppressor, a cascading system can be created. In the cascading system, any number of inrush current suppressors can be activated one after another with an approximate one half second delay in activations.

Referring back to FIG. 1, multiple inrush current suppressors 28 are shown to illustrate that any number of inrush current suppressors 28 can be arranged in a cascading system. However, since the inrush current suppressors 28 can be used to directly activate electronic equipment 22, the activation of the first inrush current suppressor is preferably selectively controlled. It is for this reason that a remote activation unit 30 can be provided. The remote activation unit 30 can be a wall switch, a control panel switch or any other manually or remotely activated switch that can be selectively thrown by a user. Alternatively, the remote activation unit 30 can be any source capable of providing a DC voltage to the second control signal input port 52 of between 5 volts and thirty volts. Once the remote activation unit 30 is activated, the first inrush current suppressor 28 is activated and the subsequent inrush current suppressors are automatically activated by the cascading effect.

Returning to FIG. 1, the power condition system 10 is shown having three major circuits, which are the voltage surge protector 24, the EMI/RFI filter 26 and the inrush current suppressor 28. The use of all three circuits in the stated order is merely exemplary. The present power condition system 10 may include any two of the circuits. Accordingly, the power condition system 10 may include a voltage surge protector 28 with either an EMI/RFI filter 26 or an inrush current suppressor 26. Similarly, the power condition system 10 may include an EMI/RFI filter 26 with either a voltage surge protector 24 or an inrush current suppressor 26.

Furthermore, the sequence in which the various circuits are used in the power conditioning system 10 can be selectively altered. In FIG. 1, the incoming power passes through the voltage purge protector 24, EMI/RFI filter 26 and then the inrush current suppressor. This sequence can be selectively changed into any alternate order.

It will be understood that the embodiments of the present invention system described and illustrated are merely exemplary and a person skilled in the art can make many variations to the shown embodiment. For example, a circuit designer can create many circuits that perform the same functions as the circuits specifically illustrated. All such alternate embodiments and modifications are intended to be included within the scope of the present invention as defined below in the claims.

What is claimed is:

1. A power conditioning system for conditioning a power transmission, said system comprising:
   a voltage surge protector for eliminating voltage spikes over a predetermined threshold in said power transmission, thereby producing a surge protected power transmission;
   a filter that receives said surge protected power transmission and reduces electromagnetic interference and radio frequency interference in said surge protected power transmission, thereby producing a filtered power transmission;
   at least one inrush current suppressor that receives said filtered power transmission and limits the current associated with said filtered power transmission, thereby producing a conditioned power transmission.

2. The system according to claim 1, wherein each said inrush current suppressor has at least one output port, and wherein each said inrush current suppressor has an activated condition, where said at least one output port receives said conditioned power transmission and a deactivated condition where said at least one output port does not receive said conditioned power transmission.

3. The system according to claim 2, wherein each said inrush current suppressor changes between said deactivated condition and said activated condition upon receipt of an incoming control signal and produces an outgoing control signal a predetermined time after said incoming control signal is received.

4. The system according to claim 3, further including multiple inrush current suppressors, wherein each of said inrush current suppressors is in a cascading arrangement wherein said outgoing control signal for one inrush current suppressor is used as said incoming control signal for another of said inrush current suppressors.

5. The system according to claim 4, wherein said multiple inrush current suppressors include a first inrush surge protector and at least one subsequent surge protector.

6. The system according to claim 5, further including a remote activation device coupled to said first inrush surge protector, wherein said remote activation device is used to selectively change said first surge protector device between said activated condition and said deactivated condition.

7. The system according to 3, wherein said predetermined time is between 0.1 seconds and 1.0 second.

8. The system according to claim 1, wherein said voltage surge protector, said filter and said at least one inrush current suppressor are contained in a single self-contained unit.

9. The system according to claim 1, wherein each said inrush current suppressor contains a main resistor through which said filtered power transmission is passed when each said inrush current suppressor is in said activated condition.

10. The system according to claim 1 wherein each said inrush current suppressor contains circuitry that bypasses said filtered transmission around said main resistor after each said inrush current suppressor has been activated for a predetermined period of time.

11. The system according to claim 1, wherein said filter includes a mutual inductor having two outgoing leads and a ferrite bead is disposed in series with each of said outgoing leads so that said protected power transmission passes through said ferrite beads after passing through said mutual inductor.

12. The system according to claim 1, wherein said inrush current suppressor, includes:
    an output port;
    an input port;
    a first circuit path extending between said input port and said output port;
    a second circuit path extending between said input port and said output port;
    at least one current limiting resistor disposed in said first circuit path that limits electricity flowing through said first circuit path to a predetermined amperage;
    a first relay disposed in said first circuit path for selectively opening and closing said first circuit path;
    a second relay disposed in said second circuit path for selectively opening and closing said second circuit path;
    circuitry coupled to said first relay and said second relay that initially closes said first circuit path and opens said second circuit path for a predetermined period of time, and then opens said first circuit path and closes said second circuit path.

13. The system according to claim 12, wherein said predetermined period of time is between ½ second and 5 seconds.

14. The system according to claim 12, wherein said circuitry initially closes said first circuit path upon receiving a control signal.

15. The system according to claim 14, wherein said circuitry creates said control signal after said second circuit path closes.

* * * * *